US008345572B2

(12) United States Patent
Furutani (10) Patent No.: US 8,345,572 B2
(45) Date of Patent: Jan. 1, 2013

(54) COMMUNICATION APPARATUS AND COMMUNICATION SYSTEM

(75) Inventor: Senichi Furutani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 331 days.

(21) Appl. No.: 12/707,208

(22) Filed: Feb. 17, 2010

(65) Prior Publication Data

US 2010/0208740 A1 Aug. 19, 2010

(30) Foreign Application Priority Data

Feb. 18, 2009 (JP) ................................ 2009-035128

(51) Int. Cl.
*H04L 12/26* (2006.01)
(52) U.S. Cl. ..................... 370/252; 370/392; 370/395.31
(58) Field of Classification Search .......................... None
See application file for complete search history.

(56) References Cited

U.S. PATENT DOCUMENTS

| | | | |
|---|---|---|---|
| 5,343,471 A | 8/1994 | Cassagnol | |
| 6,578,080 B1 | 6/2003 | Dwork | |
| 6,661,787 B1* | 12/2003 | O'Connell et al. | 370/389 |
| 7,373,425 B2* | 5/2008 | Barrack et al. | 709/238 |
| 7,730,170 B2* | 6/2010 | Richard | 709/223 |
| 7,730,210 B2* | 6/2010 | Kuik et al. | 709/245 |
| 7,796,590 B1* | 9/2010 | Melman et al. | 370/389 |
| 7,873,041 B2* | 1/2011 | Lee et al. | 370/389 |
| 7,873,711 B2* | 1/2011 | Adams et al. | 709/222 |
| 8,077,720 B2* | 12/2011 | Vuppula et al. | 370/392 |
| 8,094,666 B2* | 1/2012 | Cagenius | 370/401 |
| 8,200,798 B2* | 6/2012 | Yadav et al. | 709/223 |
| 2004/0141468 A1* | 7/2004 | Christensen et al. | 370/252 |
| 2004/0205234 A1* | 10/2004 | Barrack et al. | 709/238 |
| 2005/0213582 A1* | 9/2005 | Wakumoto et al. | 370/395.3 |
| 2008/0002705 A1 | 1/2008 | Nishimura | |
| 2008/0175251 A1* | 7/2008 | Oouchi et al. | 370/395.31 |
| 2009/0031044 A1* | 1/2009 | Barrack et al. | 709/247 |
| 2009/0172156 A1* | 7/2009 | Yadav et al. | 709/224 |
| 2011/0044208 A1* | 2/2011 | Yun et al. | 370/254 |

FOREIGN PATENT DOCUMENTS

| | | |
|---|---|---|
| GB | 2 319 149 A | 5/1998 |
| JP | 11-27310 A | 1/1999 |
| JP | 2002-77262 A | 3/2002 |
| JP | 2004-48260 A | 2/2004 |
| JP | 2005-268888 A | 9/2005 |
| JP | 2008-11081 A | 1/2008 |

OTHER PUBLICATIONS

The Extended European Search Report dated May 6, 2010 (Six (6) pages).

* cited by examiner

*Primary Examiner* — Michael J Moore, Jr.
(74) *Attorney, Agent, or Firm* — Crowell & Moring LLP (57) ABSTRACT

A communication apparatus includes a first storage portion storing an address control table registering a MAC address which each of a plurality of communication devices connected to the same local area network has, a comparison portion distinguishing each of the registered MAC addresses by comparing the MAC addresses corresponding to the plurality of communication devices registered in the address control table sequentially in a bit-by-bit manner until the MAC addresses can be distinguished from each other and a control portion determining whether or not data transmitted in the local area network is acquired on the basis of a comparison result.

19 Claims, 4 Drawing Sheets

STRUCTURE OF PACKET DATA

*FIG.4*

STRUCTURE OF MAC ADDRESS

FIG.5

MAC ADDRESS CONTROL TABLE 23

| | MAC ADDRESS |
|---|---|
| TERMINAL A | 02:E0:3B:31:29:1E |
| TERMINAL B | 02:E0:3B:31:72:EE |
| TERMINAL C | 02:E0:3B:52:01:01 |
| TERMINAL D | 02:E0:3B:76:AB:6F |
| TERMINAL E | 02:E0:3B:44:AB:5C |
| TERMINAL F | 02:E0:3B:01:0A:D3 |
| TERMINAL G | 02:E0:3B:09:1A:B3 |
| TERMINAL H | 02:E0:3B:20:CD:31 |
| TERMINAL # | ··················· |
| TERMINAL # | ··················· |

EIGHT TERMINALS ARE PECULIARLY IDENTIFIED WITH DATA OF 8 DIGITS FROM LEAST SIGNIFICANT BITS IN COMBINATION OF TERMINALS 1 TO 8 IN THIS EXAMPLE

OUI IDENTIFIER (MANUFACTURER CODE)  NODE NUMBER (MODEL MANAGEMENT CODE)

| | | | | | | |
|---|---|---|---|---|---|---|
| TERMINAL A | 00000010 | 11100000 | 00111011 | 00110001 | 00101001 | (00011110) |
| TERMINAL B | 00000010 | 11100000 | 00111011 | 00110001 | 01110010 | (11101110) |
| TERMINAL C | 00000010 | 11100000 | 00111011 | 01010010 | 00000001 | (00000001) |
| TERMINAL D | 00000010 | 11100000 | 00111011 | 01110110 | 10101011 | (01101110) |
| TERMINAL E | 00000010 | 11100000 | 00111011 | 01000100 | 10101011 | (01011100) |
| TERMINAL F | 00000010 | 11100000 | 00111011 | 00000001 | 00001010 | (11010011) |
| TERMINAL G | 00000010 | 11100000 | 00111011 | 00001001 | 00011010 | (10110011) |
| TERMINAL H | 00000010 | 11100000 | 00111011 | 00100000 | 11001101 | (00110001) |

BIT POSITION    0 ············ 23 24 ············ 47

HEAD OF DATA     COMPARISON METHOD OF MAC ADDRESS     LEAST SIGNIFICANT BIT

FIG.7

COMMUNICATION APPARATUS AND COMMUNICATION SYSTEM

BACKGROUND OF THE INVENTION

1. Field of the Invention

The present invention relates to a communication apparatus and a communication system, and more particularly, it relates to a communication apparatus connected to a local area network and a communication system constituting a local area network.

2. Description of the Background Art

A communication apparatus connected to a local area network, a communication system constituting a local area network or the like is known in general. Such a communication apparatus is disclosed in each of Japanese Patent Laying-Open Nos. 2008-11081, 2005-268888, 2004-48260, 2002-77262 and 11-27310, for example.

The aforementioned Japanese Patent Laying-Open No. 2008-11081 discloses a communication apparatus connected as a terminal of a local area network (LAN) and capable of communicating with an external network through a gateway router. In this communication apparatus described in Japanese Patent Laying-Open No. 2008-11081, when a plurality of communication apparatuses constituting the LAN transmit/receive packet data to/from a communication apparatus connected to other LAN through the external network, each communication apparatus performs address learning for an IP address which reception packet data has (processing for storing the IP address of each communication apparatus constituting the LAN), thereby specifying a destination communication apparatus.

The aforementioned Japanese Patent Laying-Open No. 2005-268888 discloses a communication apparatus controlling a LAN connected with a plurality of terminals and controlling data communication with other LAN or a wide area communication network (WAN). In the communication apparatus described in the Japanese Patent Laying-Open No. 2005-268888, when the plurality of terminals constituting the LAN transmit/receive packet data to/from a terminal connected to other LAN through the external network such as the WAN, each terminal performs address learning for an IP address (corresponding to Ipv6) which reception packet data has (operation for storing IP address of each terminal), thereby specifying a destination terminal.

The aforementioned Japanese Patent Laying-Open No. 2004-48260 discloses a packet transfer method and a packet transfer system for use in connecting a mobile terminal (mobile PC, etc.) previously connected to a prescribed LAN to other LAN in a network environment where a plurality of LANs are connected to an external network such as an Internet. In the packet transfer method described in Japanese Patent Laying-Open No. 2004-48260, a communication controller connected to a LAN controls both of IP addresses and MAC addresses (physical addresses unique to terminals) of a plurality of the mobile terminals in the LAN. Thus, when the mobile terminal is moved from the single LAN to other LAN to be connected, the communication controller is enabled to transfer packet data to a destination terminal on the basis of a substitution MAC address assigned for convenience after movement from an original MAC address.

The aforementioned Japanese Patent Laying-Open No. 2002-77262 discloses an information relay apparatus controlling a LAN connected with a plurality of terminals and controlling communication with other LAN or a WAN. In the information relay apparatus described in Japanese Patent Laying-Open No. 2002-77262, when the plurality of terminals constituting the LAN transmit/receive packet data to/from a terminal connected to other through an external network such as the LAN or the WAN, each terminal performs address learning for an IP address (corresponding to Ipv6) which reception packet data has (operation for storing IP address of each terminal), thereby specifying a destination terminal.

The aforementioned Japanese Patent Laying-Open No. 11-27310 discloses a high-speed LAN switching control method in a network environment where a plurality of LANs are connected to a single LAN switch (packet switching apparatus) and the system. In the high-speed LAN switching control method and the system described in Japanese Patent Laying-Open No. 11-27310, the system controls both of IP addresses and global MAC addresses of the plurality of terminals connected to the LAN with a control table stored in the LAN switch. At this time, the control table stores local MAC addresses (addresses assigned for convenience for distinguishing the terminals in the LAN each LAN) in addition to the aforementioned IP addresses and global MAC addresses. Thus, when communication performs between terminals, the LAN switch receiving communication request searches a destination terminal on the basis of correspondence relationship between the global MAC addresses and the local MAC addresses registered in the control table.

In the conventional communication apparatus or packet transfer method disclosed in each of the aforementioned Japanese Patent Laying-Open Nos. 2008-11081, 2005-268888, 2004-48260 and 2002-77262, however, the apparatus conceivably sequentially checks a destination address given to the packet data and the addresses in a control table to specify a destination (destination terminal) of the packet data in packet communication while controlling the IP addresses and the MAC addresses, which the terminals constituting the LAN have, with the single control table in an integrated manner. The IP addresses have 32-bit wide (in a case of Ipv4) or 128-bit wide (in a case of Ipv6), and the MAC addresses have 48-bit wide, and hence addresses having enormous quantities of data volume (bit length) must be conceivably checked for the one destination address when checking the addresses for all data. Thus, arithmetic processing in checking the addresses becomes disadvantageously considerably overloaded.

In the aforementioned conventional high-speed LAN switching control method disclosed in Japanese Patent Laying-Open No. 11-27310, arithmetic processing specifying the destination of the packet data is performed with reference to the local MAC addresses (address given for convenience for distinguishing each terminal in the LAN) in addition to the IP addresses and global MAC addresses of the terminals in packet communication, and hence the arithmetic processing becomes disadvantageously considerably overloaded due to increased reference data volume (bit length) constituted by the IP addresses, the global MAC addresses, the local MAC addresses and the like.

SUMMARY OF THE INVENTION

The present invention has been proposed in order to solve the aforementioned problems, and an object of the present invention is to provide a communication apparatus and a communication system each capable of reducing a load of arithmetic processing in checking addresses.

A communication apparatus according to a first aspect of the present invention comprises a first storage portion storing an address control table registering a MAC address which each of a plurality of communication devices connected to the same local area network has, a comparison portion distinguishing each of the registered MAC addresses by comparing the MAC addresses corresponding to the plurality of communication devices registered in the address control table sequentially in a bit-by-bit manner until the MAC addresses can be distinguished from each other, and a control portion determining whether or not data transmitted in the local area network is acquired on the basis of a comparison result by the comparison portion.

As hereinabove described, this communication apparatus according to the first aspect of the present invention comprises the comparison portion distinguishing each of the registered MAC addresses by comparing the MAC addresses corresponding to the plurality of communication devices registered in the address control table sequentially in the bit-by-bit manner until they can be distinguished from each other, whereby each of the plurality of communication devices is distinguished by using only the MAC addresses, and therefore data volume (bit length) in a case of referring the MAC addresses is further reduced dissimilarly to a case where the destination communication device is specified by referring both of IP addresses and the MAC addresses of the communication devices in data communication, and hence a load of arithmetic processing in checking the addresses can be reduced. Further, the arithmetic processing of the control portion can be stopped when completing distinction of the registered MAC addresses, and hence the load of the control portion can be more rapidly suppressed.

The aforementioned communication apparatus according to the first aspect comprises the control portion determining whether or not data transmitted in the local area network is acquired on the basis of the comparison result by the comparison portion distinguishing each of the registered MAC addresses corresponding to the plurality of communication devices, whereby the MAC addresses registered in the address control table are controlled in a state where they are previously distinguished from each other by the comparison portion, and hence the control portion can check the address control table and the destination MAC address on the basis of the comparison result by the comparison portion when the destination communication device of the data transmitted in the local area network is specified. Thus, the load of the arithmetic processing of the control portion in checking the addresses can be reduced, dissimilarly to a case of sequentially checking the destination MAC address while referring the MAC addresses registered in a state where they are not distinguished from each other.

In the aforementioned communication apparatus according to the first aspect, the MAC address preferably includes a first address data region recording a manufacturer of the communication device and a second address data region recording a unique number assigned to each of the communication devices by the manufacturer, and the comparison portion preferably distinguishes each of the registered MAC addresses by comparing the MAC addresses corresponding to the plurality of communication devices from the second address data regions of the MAC addresses sequentially in the bit-by-bit manner until the MAC addresses can be distinguished from each other. According to this structure, the comparison portion compares while giving preference to the second address data regions recording "node numbers" (model management codes such as serial numbers managed by the manufacturer) over the first address data regions recording "OUI identifiers" (manufacturer code managed by IEEE), and hence the plurality of communication devices can be individually distinguished more rapidly and reliably also under a network environment constituted only by the communication devices of the same manufacturer.

In the aforementioned structure in which the MAC address includes the first and second address data regions, the second address data region is preferably arranged on a low-order side of the MAC address, and the comparison portion preferably distinguishes each of the registered MAC addresses by comparing the second address data regions sequentially from least significant bit sides in the second address data regions of the MAC addresses in the bit-by-bit manner until the MAC addresses corresponding to the plurality of communication devices can be distinguished from each other. According to this structure, the comparison portion compares the node numbers sequentially from the numbers corresponding to the least significant bits of the data recording the "node numbers" (manufacturer's serial numbers and the like), and hence the "node numbers" which the plurality of communication devices have can be more rapidly distinguished.

In the aforementioned structure in which the comparison portion compares the second address data regions, if each of the registered MAC addresses is not distinguished on the basis of the comparison result of the second address data regions by the comparison portion, the comparison portion preferably distinguishes each of the registered MAC addresses by comparing the first address data regions of the MAC addresses sequentially in the bit-by-bit manner until the MAC addresses corresponding to the plurality of communication devices can be distinguished from each other. According to this structure, the comparison portion can further compare the "OUI identifiers" recorded in the first address data region, and hence the plurality of the communication devices can be easily individually distinguished also in a case where distinction by the "node numbers" is impossible.

In the aforementioned structure in which the MAC address includes the first and second address data regions, the first address data region is preferably arranged on a high-order side of the MAC address, and the second address data region is arranged on a low-order side of the MAC address, and the first address data region is preferably half of a data region from the high-order side in all of the data region, which the MAC address has, to the low-order side, and the second address data region is half of the data region from the low-order side in the all data region to the high-order side. According to this structure, the comparison portion simply compares each of the MAC addresses corresponding to the plurality of the communication devices for the second address data region consisting of a half of a data length which the MAC address has, and hence the plurality of communication devices can be rapidly distinguished.

In the aforementioned structure in which the MAC address includes the first and second address data regions, the second address data region is preferably formed by address data having a 8-bit data length in a lump, and the comparison portion preferably distinguishes each of the registered MAC addresses by comparing the address data having the 8-bit data length in a lump from least significant bit sides in the second address data regions of the MAC addresses until the MAC addresses corresponding to the plurality of communication devices can be distinguished from each other. According to this structure, the comparison portion simply compares each of the MAC addresses corresponding to the plurality of communication devices by performing arithmetic processing for data of 8-bit data length in a lump once, and hence the plurality of the communication devices can be more rapidly distinguished dissimilarly to a case where processing for comparing every 1 bit or every 2 bits is repeated, for example.

In this case, the comparison portion preferably includes a 16-bit processor or a 32-bit processor. According to this structure, it is possible to perform a processing operation suitable for the aforementioned arithmetic processing for data of 8-bit data length in a lump when the comparison portion is constituted by the 16-bit processor or the 32-bit processor.

In the aforementioned communication apparatus according to the first aspect, the comparison portion is preferably formed to end the comparison in the bit-by-bit manner when each of the registered MAC addresses is distinguished. According to this structure, the comparison arithmetic processing of the control portion can be stopped when completing distinction of the registered MAC addresses, and hence a load of the control portion can be more rapidly suppressed.

In this case, the control portion is preferably so formed as to create the comparison result on the basis of the end of the comparison in the bit-by-bit manner by the comparison portion. According to this structure, the control portion can reliably create the comparison result.

The aforementioned communication apparatus according to the first aspect preferably further comprises a second storage portion storing the comparison result where each of the MAC addresses are distinguished by the comparison portion, wherein the control portion is formed to determine whether or not the data transmitted in the local area network is acquired on the basis of the comparison result stored in the second storage portion. According to this structure, the control portion can easily check the address control table and the destination MAC address on the basis of the comparison result stored in the second storage portion.

In the aforementioned communication apparatus according to the first aspect, the control portion preferably controls to transmit the comparison result to each of the plurality of communication devices. According to this structure, each of the plurality of communication devices can share the comparison result in the same local network.

In the aforementioned communication apparatus according to the first aspect, the control portion is preferably formed to create the address control table by sequentially acquiring the MAC address, which each of the plurality of communication devices has, from each of the plurality of communication devices. According to this structure, the MAC addresses which all of the communication devices connected to the same local area network have can be reliably acquired.

In the aforementioned communication apparatus according to the first aspect, the local area network is preferably connected to an external network, and the control portion preferably controls to determine whether or not data transmitted in the local area network through the external network is acquired on the basis of the comparison result by the comparison portion. According to this structure, each of the plurality of communication devices is distinguished by employing only the MAC addresses also in an environment where the communication devices constituting the local area network are individually connected to the external network such as the Internet, and hence a load of the control portion can be reliably reduced dissimilarly to a case of specifying the destination communication device by referring both of the IP addresses and the MAC addresses in data communication with the external network.

In the aforementioned communication apparatus according to the first aspect, the comparison of the MAC addresses by the comparison portion is preferably performed on a data link layer in an OSI reference model. According to this structure, each of the plurality of the communication devices may not be distinguished by using the network layer which is a higher order than the data link layer, and hence communication between the communication devices in the local area network can be performed by a simple communication protocol.

A communication system according to a second aspect of the present invention comprises a plurality of communication devices connected to the same local area network; each of the plurality of communication devices includes a first storage portion storing an address control table registering a MAC address which each of the plurality of communication devices has, a comparison portion distinguishing each of the registered MAC addresses by comparing the MAC addresses corresponding to the plurality of communication devices registered in the address control table sequentially in a bit-by-bit manner until the MAC addresses can be distinguished from each other, and a control portion determining whether or not data transmitted in the local area network is acquired on the basis of a comparison result by the comparison portion.

As hereinabove described, the communication system according to the second aspect of the present invention includes the comparison portion distinguishing each of the registered MAC addresses by comparing the MAC addresses registered in the address control table, corresponding to the plurality of communication devices sequentially in the bit-by-bit manner until they can be distinguished from each other, whereby each of the plurality of communication devices is distinguished by using only the MAC addresses, and therefore data volume (bit length) in a case of referring only the MAC addresses is further reduced dissimilarly to a case where the destination communication device is specified by referring both of IP addresses and the MAC addresses of the communication devices in data communication, and hence the communication system reducing a load of the arithmetic processing of the control portion in checking the addresses can be achieved. Further, the arithmetic processing of the control portion can be stopped when completing distinction of the registered MAC addresses, and hence the load of the control portion can be more rapidly reduced.

The aforementioned communication system according to the second aspect includes the control portion determining whether or not data transmitted in the local area network is acquired on the basis of the comparison result by the comparison portion distinguishing each of the registered MAC addresses corresponding to the plurality of communication devices, whereby the MAC addresses registered in the address control table are controlled in a state where they are previously distinguished from each other by the comparison portion, and hence the control portion can check the address control table and the destination MAC address on the basis of the comparison result by the comparison portion when the destination communication device of the data transmitted in the local area network is specified. Thus, the communication system reducing the load of the arithmetic processing of the control portion in checking the addresses can be achieved, dissimilarly to a case of sequentially checking the destination MAC address while referring the MAC addresses registered in a state where they are not distinguished from each other.

In the aforementioned communication system according to the second aspect, the MAC address preferably includes a first address data region recording a manufacturer of the communication device and a second address data region recording a unique number assigned to each of the communication devices by the manufacturer, and the comparison portion preferably distinguishes each of the registered MAC addresses by comparing the MAC addresses corresponding to the plurality of communication devices from the second address data regions of the MAC addresses sequentially in the bit-by-bit manner until the MAC addresses can be distinguished from each other. According to this structure, the comparison portion compares while giving preference to the second address data regions recording "node numbers" (model management codes such as serial numbers managed by the manufacturer) over the first address data regions recording "OUI identifiers" (manufacturer code managed by IEEE), and hence the communication system capable of individually distinguishing the plurality of communication devices more rapidly and reliably also under a network environment constituted only by the communication devices of the same manufacturer can be achieved.

In the aforementioned structure in which the MAC address includes the first and second address data regions, the second address data regions are preferably arranged on low-order sides of the MAC addresses, and the comparison portion preferably distinguishes each of the registered MAC addresses by comparing the second address data regions sequentially from least significant bit sides in the second address data regions of the MAC addresses in the bit-by-bit manner until the MAC addresses corresponding to the plurality of communication devices can be distinguished from each other. According to this structure, the comparison portion compares the node numbers sequentially from the numbers corresponding to the least significant bits of the data recording the "node numbers" (manufacturer's serial numbers and the like), and hence the "node numbers" which the plurality of communication devices have can be more rapidly distinguished.

In the aforementioned structure in which the comparison portion compares the second address data regions, if each of the registered MAC addresses is not distinguished on the basis of the comparison result of the second address data regions by the comparison portion, the comparison portion preferably distinguishes each of the registered MAC addresses by comparing the first address data regions of the MAC addresses sequentially in the bit-by-bit manner until the MAC addresses corresponding to the plurality of communication devices can be distinguished from each other. According to this structure, the comparison portion can further compare the "OUI identifiers" recorded in the first address data region, and hence the plurality of the communication devices can be easily individually distinguished also in a case where distinction by the "node numbers" is impossible.

In the aforementioned structure in which the MAC address includes the first and second address data regions, the first address data region is preferably arranged on a high-order side of the MAC address, while the second address data region is preferably arranged on a low-order side of the MAC address, and the first address data region is preferably half of a data region from the high-order side in all of the data region, which the MAC address has, to the low-order side, and the second address data region is half of the data region from the low-order side in the all data region to the high-order side. According to this structure, the comparison portion simply compares each of the MAC addresses corresponding to the plurality of the communication devices for the second address data region consisting of a half of a data length which the MAC address has, and hence the plurality of communication devices can be rapidly distinguished.

In the aforementioned structure in which the MAC address includes the first and second address data regions, the second address data region is preferably formed by address data having a 8-bit data length in a lump, and the comparison portion preferably distinguishes each of the registered MAC addresses by comparing the address data having the 8-bit data length in a lump from least significant bit sides in the second address data regions of the MAC addresses until the MAC addresses corresponding to the plurality of communication devices can be distinguished from each other. According to this structure, the comparison portion simply compares each of the MAC addresses corresponding to the plurality of communication devices by performing arithmetic processing for data of 8-bit data length in a lump once, and hence the communication system capable of more rapidly distinguishing the plurality of the communication devices can be achieved dissimilarly to a case where processing for comparing every 1 bit or every 2 bits is repeated, for example.

In the aforementioned communication system according to the second aspect, the comparison portion is preferably formed to end the comparison in the bit-by-bit manner when each of the registered MAC addresses is distinguished. According to this structure, the comparison arithmetic processing of the control portion can be stopped when completing distinction of the registered MAC addresses, and hence the communication system capable of more rapidly suppressing a load of the control portion can be achieved.

In the aforementioned communication system according to the second aspect, each of the plurality of communication devices preferably further includes a second storage portion storing the comparison result where each of the MAC addresses is distinguished by the comparison portion, wherein the control portion is preferably formed to determine whether or not the data transmitted in the local area network is acquired on the basis of the comparison result stored in the second storage portion. According to this structure, the control portion which the communication device has can easily check the address control table and the destination MAC address on the basis of the comparison result stored in the second storage portion.

In the aforementioned communication system according to the second aspect, the local area network is preferably connected to an external network, and the control portion preferably controls to determine whether or not data transmitted in the local area network through the external network is acquired on the basis of the comparison result by the comparison portion. According to this structure, each of the plurality of communication devices is distinguished by employing only the MAC addresses also in an environment where the communication devices constituting the local area network are individually connected to the external network such as the Internet, and hence the communication system capable of reliably reducing a load of the control portion which the communication device has can be dissimilarly to a case of specifying the destination communication device by referring both of the IP addresses and the MAC addresses in data communication with the external network.

In the aforementioned communication system according to the second aspect, the comparison of the MAC addresses by the comparison portion is preferably performed on a data link layer in an OSI reference model. According to this structure, each of the plurality of the communication devices may not be distinguished by using the network layer which is a higher order than the data link layer, and hence the communication system allowing communication between the communication devices in the local area network by a simple communication protocol can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a local area network 4 and each of communication devices 10 (terminals A to H) constituting the local area network 4 according to the embodiment of the present invention will be now described with reference to FIGS. 1 to 6.

Figure 1:
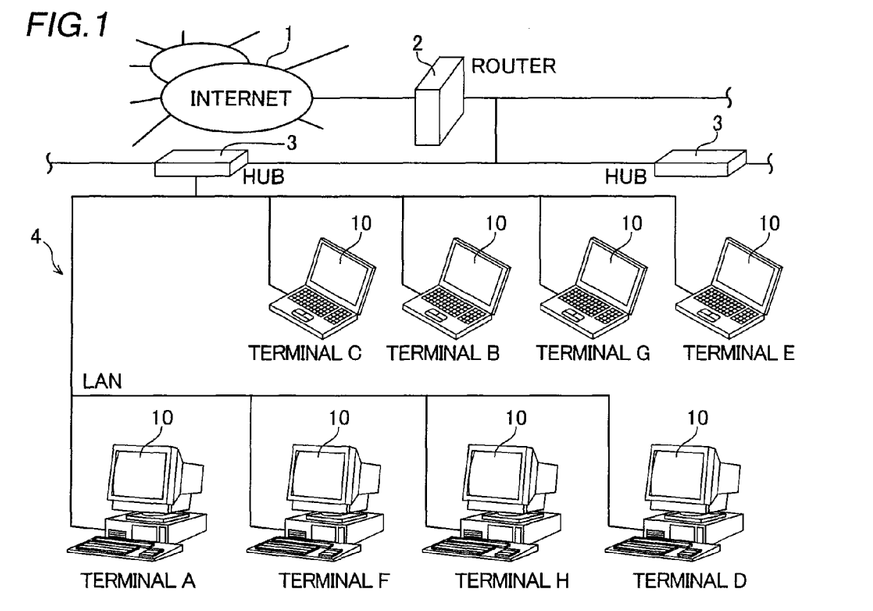
FIG. 1 is a conceptual diagram showing a structure of a local area network connected to communication devices according to an embodiment of the present invention.

As shown in FIG. 1, the communication devices 10 according to the embodiment of the present invention are constituted by terminal apparatuses as the single local area network (LAN) 4 connected through a router 2 or a hub 3 from an external network 1 such as an Internet. The router 2 is a communication device constituted so as to perform connection from a first layer (physical layer) to a third layer (network layer) in an OSI reference model consisting of seven layers classifying functions of a computer network and to communicate IP packets through the local area network by the terminals. The hub 3 has a function as a concentrator electrically connecting the respective terminals (communication devices 10) constituting the single local area network 4 by a LAN cable and the like.

Figure 2:
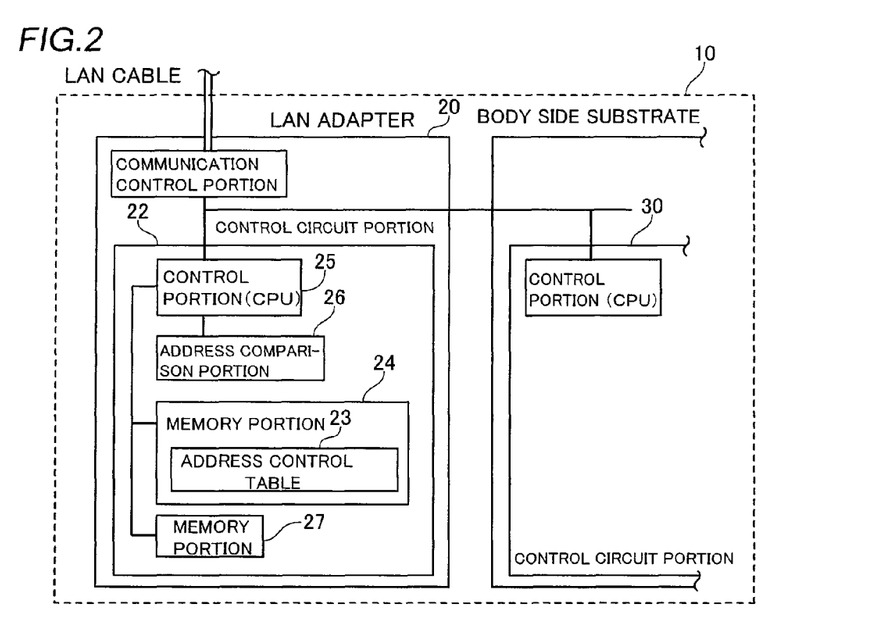
FIG. 2 is a block diagram showing a control circuit portion constituting each communication device shown in FIG. 1.

The respective communication devices 10 constituting the local area network 4 (eight communication devices 10 of the terminals A to H in total constituting the single local area network 4 in FIG. 1 in this embodiment) and the router 2 are individually provided with LAN adapters 20 such as LAN cards or LAN boards. Each communication device 10 or the router 2 provided with the LAN adapter 20 is an example of the "communication device" in the present invention. The LAN adapter 20 constitutes a part of a control circuit portion provided in the communication device 10, and has a communication control portion 21 performing transmitting processing and receiving processing of packet data 50 (see FIG. 3) through the local area network 4 and a control circuit portion performing various processing operations between the control circuit portion 22 and a control circuit portion 30 of the communication device body on the basis of contents of the packet data 50, as shown in FIG. 2.

Figure 3:
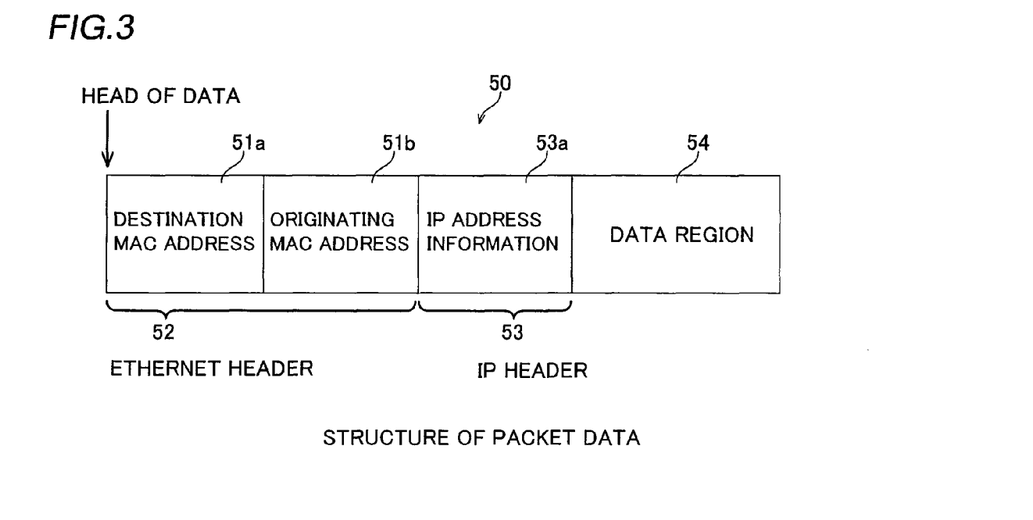
FIG. 3 is a diagram showing a structure of packet data handled by the communication device shown in FIG. 1.

A structure of the packet data 50 through the LAN will be now described. The packet data 50 is constituted by an Ethernet header 52 consisting of a destination MAC address 51a and an originating MAC address 51b, an IP header 53 including IP address information 53a and a data region 54 including contents such as characters, images or music data actually transmitted, sequentially from the head of the data, as shown in FIG. 3. The packet data 50 is an example of the "data" in the present invention.

A MAC address 51 such as the destination MAC address 51a or the originating MAC address 51b (see FIG. 3) generally means an identification number (physical address) unique to a hardware, assigned to each of the communication devices 10, and an address located on the first layer (physical layer) and a second layer (data link layer) in the OSI reference model. Thus, the communication devices 10 can be individually specified by identifying the MAC addresses 51 in network communication. In each of the communication devices 10 used under a LAN connection environment, the MAC address 51 is written in the LAN adapter 20 provided in the communication device 10. The MAC address 51 is converted to a notation (see FIG. 4) according to a hexadecimal system by a key board operation of the communication device 10, and can be confirmed from a monitor (display screen portion) or the like.

Figure 4:
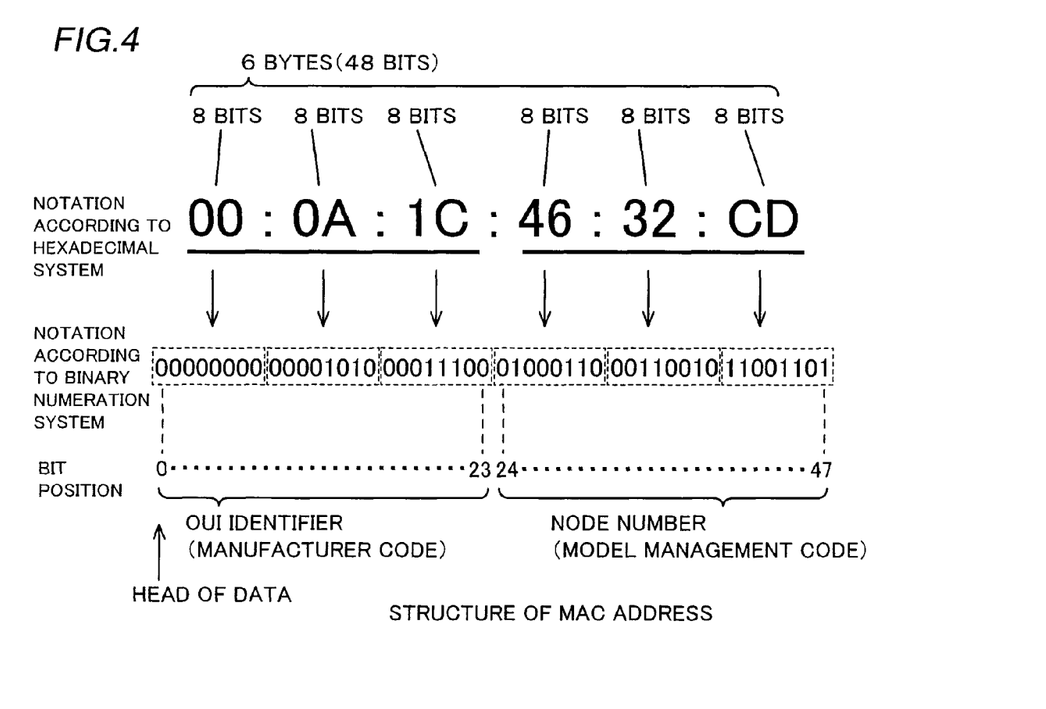
FIG. 4 is a diagram showing a detailed structure regarding a MAC address in the packet data shown in FIG. 3.

The format of the MAC address 51 is constituted by an "OUI identifier (manufacturer code)" managed by IEEE (Institute of Electrical and Electronic Engineers) and an "node number (model management code)" managed by a manufacturer, and the "OUI identifier" and the "node number" each have a data region of 3 bytes (=8 bits×3=24 bits), as shown in FIG. 4. Therefore, the "OUI identifier" occupies a region from the head of the MAC address 51 (0th bit) to the 23rd bit, and the "node number" occupies a region from the 24th bit to the 47th bit (least significant bit). Thus, the MAC address 51 is written in a chip having data volume of 48-bit wide as a whole. The region from the 0th bit to the 23rd bit in the MAC address 51 is an example of the "first address data region" in the present invention, and the region from the 24th bit to the 47th bit is an example of the "second address data region" in the present invention.

Figure 5:
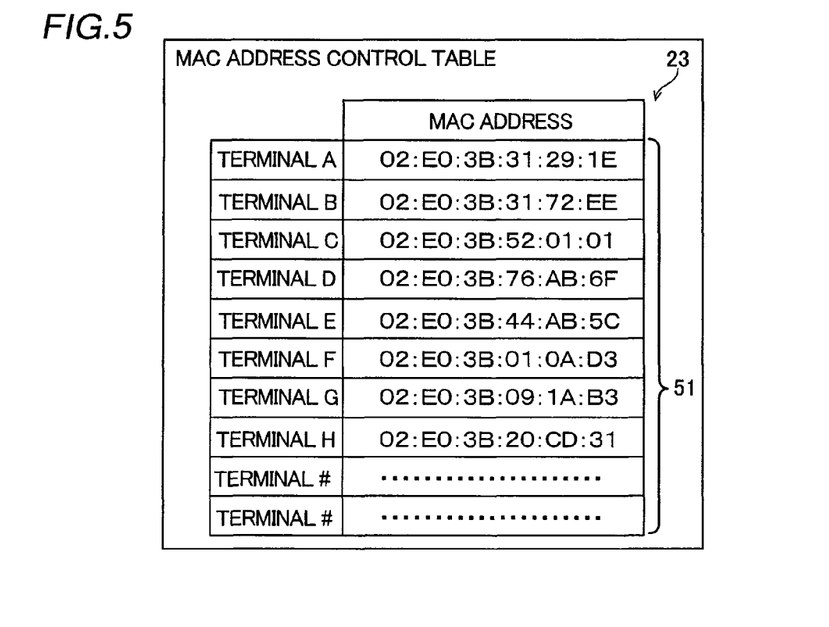
FIG. 5 is a diagram showing a structure of a MAC address control table handled by the communication device shown in FIG. 1.
Figure 6:
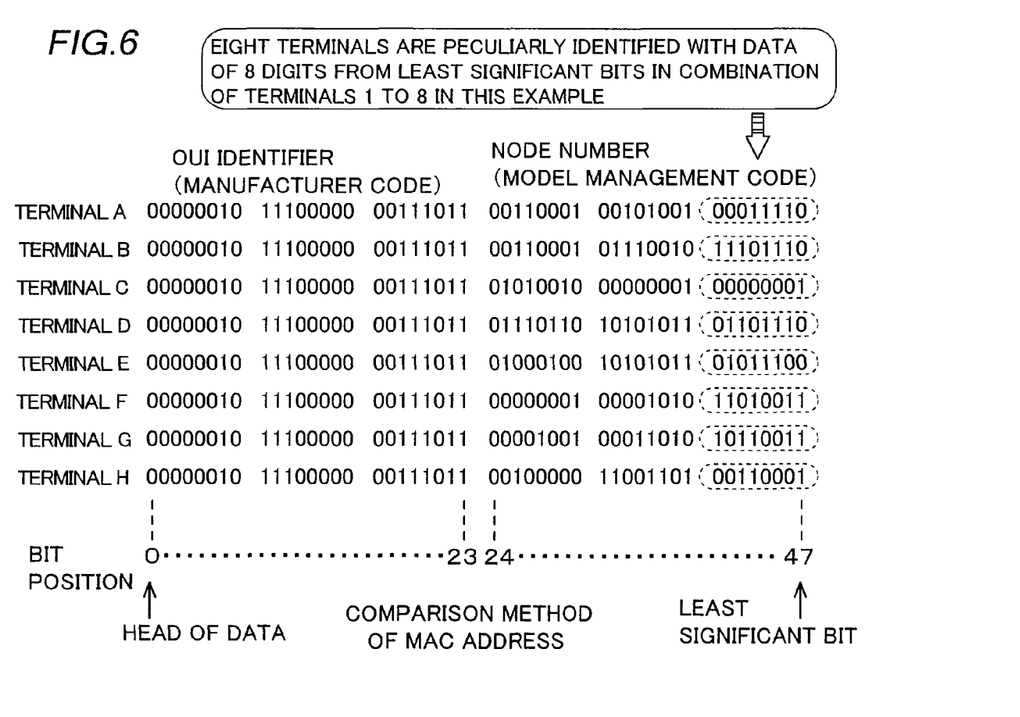
FIG. 6 is a schematic diagram in comparison of the MAC addresses by the communication device shown in FIG. 1.

In this embodiment, the control circuit portion 22 of the LAN adapter 20 is provided with a memory portion 24 storing in an address control table 23, as shown in FIG. 2. As shown in FIG. 5, all of the MAC addresses 51 which the respective communication devices 10 (terminals A to H in FIG. 1) connected to the same local area network 4 have are registered in the address control table 23. While the MAC addresses 51 are described by the notation according to the hexadecimal system for convenience in FIG. 5, the MAC addresses 51 are actually stored in the memory portion 24 in a binary code state as shown in FIG. 6. The address control table 23 is created by sequentially acquiring a MAC address 51, which other LAN adapter 20 has, and writing the same in the memory portion 24 when the control portion (CPU) 25 of the LAN adapter 20 performs communication with other LAN adapter 20 (communication device 10) through the communication control portion 21. The memory portion 24 is an example of the "first storage portion" in the present invention. The same address control table 23 is stored in the memory portion 24 of each of the LAN adapters 20 of the terminals A to H, and hence the terminals A to H can share the MAC addresses 51 of all of the communication devices 10 connected to the local area network 4.

In this embodiment, each control circuit portion 22 of the LAN adapter 20 is provided with the address comparison portion 26 (see FIG. 2). This address comparison portion 26 receives an instruction from the control portion 25, and performs learning of the MAC addresses 51 registered in the address control table 23. More specifically, the address comparison portion 26 performs arithmetic processing for comparing the MAC addresses 51 (8 different patterns) registered in the address control table 23 (see FIG. 5) until they can be distinguished from each other, so that each of the registered MAC addresses 51 is identified.

In this embodiment, in the aforementioned comparison arithmetic processing of the MAC addresses 51, the address comparison portion 26 compares the "node numbers" (regions from the 24th bits to the 47th bits) in the eight MAC addresses 51, so that each of the registered MAC address 51 is distinguished, as shown in FIG. 6. At this time, the address comparison portion 26 sequentially compares the eight MAC addresses 51 from the least significant bits (47th bits) of the "node numbers" to higher-order bits in a bit-by-bit manner (every bit).

As shown in FIG. 2, each control circuit portion 22 is provided with a memory portion 27 storing a comparison result obtained by distinguishing each of the MAC addresses 51 by the address comparison portion 26. In other words, a comparison result that "each of the terminals A to H can be peculiarly identified with data of 8 bits (8 digits) from the least significant bits" is stored in the memory portion 27 in an example of FIG. 6. The memory portion 27 is an example of the "second storage portion" in the present invention.

In this embodiment, the control portion 25 determines acquisition of the packet data 50 transmitted in the local area network 4 on the basis of the comparison result stored in the memory portion 27 by learning of the MAC addresses 51 (storing the comparison result by the address comparison portion 26 in the memory portion 27). In other words, when checking the destination MAC address 51a constituting the packet data 50 and its own MAC address 51, the control portion 25 of each LAN adapter 20 can check the destination MAC address 51a and its own MAC address 51 on the basis of the comparison result ("check is completed by referring only from the least significant bits of the MAC addresses 51 to the data of 8 bits (8 digits))" in the example in FIG. 6, for example) by the address comparison portion 26 without checking all data of 48 bits of the MAC addresses 51. Thus, the control portion 25 of each LAN adapter can perform information processing regarding check of addresses with smaller information volume, and hence a load of the arithmetic processing in acquiring the packet data 50 is reduced.

While each of the eight terminals A to H can be identified with the data of 8 bits (8 digits) from the least significant bits of the MAC addresses 51 in the aforementioned description (FIG. 6), the eight terminals A to H may be individually identified with data of 3 bits (3 digits) from the least significant bits since there are up to $2^3=8$ difference patterns with the data of 3 bits (3 digits) from the least significant bits in theory. In other words, in a case where the address comparison portion 26 obtains a result that "check is completed by referring only the data of 3 bits (3 digits) from the least significant bits of the MAC addresses 51)", when the control portion 25 of each LAN adapter 20 checks the destination MAC address 51a and its own MAC address 51, the check can be simply completed with reference to the data of 3 bits from the least significant bits of the MAC addresses 51, and hence the load of the arithmetic processing can be further reduced.

In this embodiment, when the address comparison portion 26 obtains the comparison result, the control portion 25 ends comparing processing in the bit-by-bit manner for the eight MAC addresses 51. The comparing processing of the MAC addresses 51 by the address comparison portion 26 may be performed by a software with a computer program, or may be performed by forming a comparator circuit in the control circuit portion 22.

A control flow in leaning of the MAC addresses 51 of the communication devices 10 according to this embodiment will be now described with reference to FIGS. 1, 2 and 5 to 7. In the following, a control operation of the LAN adapter 20 which each communication devices 10 has in a case where the eight terminals A to H (communication devices 10) are connected to the single local area network 4 through the hub 3 will be described.

Figure 7:
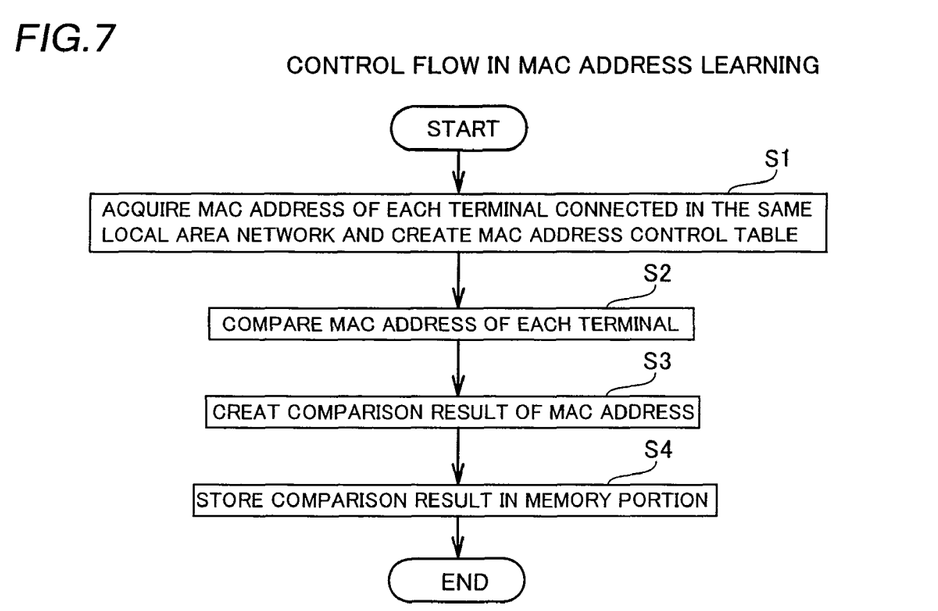
FIG. 7 is a diagram showing a control flow in MAC address learning of the communication device according to the embodiment of the present invention.

In a case where the terminals A to H are connected to the local area network 4, the control portion 25 (see FIG. 2) of each terminal sequentially acquires the MAC addresses 51, which other LAN adapters 20 (terminals A to H) connected to the local area network 4 (see FIG. 1) individually have, through its own communication control portion 21 (see FIG. 2) and create the address control table 23 (see FIG. 5) at a step S1, as shown in FIG. 7. Then, the created address control table 23 is written in the memory portion 24 (see FIG. 2) of each terminal. At this state, a list of the MAC addresses 51 which the terminals A to H have is simply created, and the control portion 25 does not individually distinguish the MAC addresses 51 of the terminals A to H.

At a step S2, the control portion 25 of each terminal performs processing for comparing the eight MAC addresses 51 in the address control table 23. In other words, the address comparison portion 26 which has received a request of the control portion 25 determines whether or not the eight MAC addresses 51 can be distinguished in 8 different patterns by comparing the least significant bits of the "node numbers" in the eight MAC addresses 51 which the terminals A to H have, as shown in FIG. 6. In the example of FIG. 6, the eight MAC addresses 51 can not be distinguished in the 8 different patterns only with the least significant bits, and hence the address comparison portion 26 increases the number of bits for comparison by 1 bit.

In other words, the address comparison portion 26 determines again whether or not the eight MAC addresses 51 can be distinguished in the 8 different patterns by comparing the numbers of two digits (2 bits) of the least significant bits and the higher-order bits (46th bits) adjacent to the least significant bits. In the example of FIG. 6, the eight MAC addresses 51 can not be distinguished from each other also at this state, and hence the address comparison portion 26 further increases the number of bits for comparison by 1 bit. In other words, the address comparison portion 26 determines again whether or not the eight MAC addresses 51 can be distinguished in the 8 different patterns ($=2^3$ different patterns) by comparing the numbers of three digits (3 bits) of the least significant bits, the 46th bits and the 45th bits.

At the step S2, the address comparison portion 26 repeats the aforementioned processing until the eight MAC addresses 51 can be distinguished from each other, so that each of the registered eight MAC addresses 51 is distinguished. The example in FIG. 6 shows that the MAC addresses 51 of the terminals A to H can be distinguished in the 8 different patterns when data from the least significant bits to the data of 8 bits are compared.

At a step S3, the control portion 25 of each terminal creates a comparison result that the respective MAC addresses 51 are distinguished by the address comparison portion 26. In other words, the comparison result that "the respective terminals A to H can peculiarly identified with data of 8 bits (8 digits) from the least significant bits" is created in the example of FIG. 6. When the comparison result is created at the step S3, the control portion 25 of each terminal ends the processing in the step S2.

At a step S4, the control portion 25 of each terminal stores the aforementioned comparison result created on the basis of end of the comparison result in its own memory portion 27. Thus, the leaning of the MAC addresses 51 in the control portion 25 is performed. While the learning of the MAC addresses 51 in the control portion 25 is performed in the aforementioned LAN adapters 20, similar learning for the connected terminals A to H is performed also in the router 2. Thus, the router 2 also shares information that "each of the terminals A to H can peculiarly identified with the data of 8 bits (8 digits) from the least significant bits".

According to this embodiment, as hereinabove described, the communication device 10 comprises the address comparison portion 26 distinguishing each of the MAC addresses 51 registered in the address control table 23 by comparing the eight MAC addresses 51 corresponding to the plurality of communication devices 10 (terminals A to H) sequentially in the bit-by-bit manner until they can be distinguished from each other, whereby each of the terminals A to H is distinguished by using only the MAC addresses 51, and therefore data volume (bit length) in a case of referring only the MAC addresses 51 is further reduced dissimilarly to a case where the destination terminals A to H are specified by referring both of the IP addresses and the MAC addresses of the terminals A to H in communication of the packet data 50, and hence a load of the arithmetic processing of the control portion 25 in checking the destination MAC address 51a and its own MAC address 51 can be reduced.

According to this embodiment, the communication device 10 comprises the control portion 25 determining whether or not the packet data 50 transmitted in the local area network 4 is acquired on the basis of the comparison result according to the address comparison portion 26 distinguishing each of the registered eight MAC addresses 51 corresponding to the plurality of communication devices 10 (terminals A to H), whereby the MAC addresses 51 registered in the address control table 23 is controlled in a state where they are previously distinguished from each other by the address comparison portion 26, and hence the control portion 25 can check the address control table 23 and the destination MAC address 51a on the basis of the previous comparison result by the address comparison portion 26 when the destination communication device 10 (any of the terminals A to H) of the packet data 50 transmitted in the local area network 4 is specified. Thus, the load of the arithmetic processing of the control portion 25 in checking the destination MAC address 51a and its own MAC address 51 can be reduced, dissimilarly to a case where the control portion 25 sequentially checks the destination MAC address 51a given to the packet data 50 is sequentially checked while referring the MAC addresses 51 registered in a state where they are not distinguished from each other.

According to this embodiment, the address comparison portion 26 is so formed that each of the registered MAC addresses 51 is distinguished by comparing the eight MAC addresses 51 corresponding to the plurality of the communication devices 10 (terminals A to H) from the data regions recording the "node numbers" of the MAC addresses 51 sequentially in the bit-by-bit until the MAC addresses 51 can be distinguished from each other, whereby the address comparison portion 26 compares the MAC addresses 51 while giving preference to the data regions recording the "node numbers" over the data regions recording the "OUI identifiers", and hence the terminals A to H can be individually distinguished more rapidly and reliably also when the local area network 4 is constituted only by the communication devices 10 of the same manufacturer.

According to this embodiment, the address comparison portion 26 is so formed that each of the registered MAC addresses 51 is distinguished by comparing the data regions of the "node numbers" from the least significant bits in the data regions recording the "node numbers" of the MAC addresses 51 sequentially in the bit-by-bit manner until the eight MAC addresses 51 corresponding to the plurality of the communication devices 10 (terminals A to H) can be distinguished from each other, whereby the address comparison portion 26 compares serial numbers sequentially from the numbers corresponding to the least significant bits of the "node number" data recording manufacturer's serial numbers and the like toward the numbers of the higher-order bits, and hence the serial numbers which the terminals A to H have can be more rapidly distinguished.

According to this embodiment, the MAC address 51 is so formed that the "OUI identifier" is recorded in half of the data region (24 bits) from a high-order side (0th bit) to a low-order side (23rd bit) in all of the data region and the "node number" is stored in half of the data region (24 bits) from a low-order side (47th bit) to a high-order side (24th bit), whereby the address comparison portion 26 simply compares each of the eight MAC addresses 51 corresponding to the plurality of the communication devices 10 (terminals A to H) for the data region consisting of 24-bit (3 bytes) wide of a half of 48-bit (6 bytes) wide which the MAC address 51 has, and hence the plurality of communication devices 10 can be rapidly distinguished.

According to this embodiment, the address comparison portion 26 is so formed as to end comparison in the bit-by-bit manner when the registered MAC addresses 51 are distinguished, whereby the comparison arithmetic processing of the control portion 25 can be stopped when completing distinction of the registered MAC addresses 51, and hence a load of the control portion 25 can be more rapidly suppressed.

According to this embodiment, the control portion 25 is so formed as to create the comparison result on the basis of the end of the comparison in the bit-by-bit manner by the address comparison portion 26, whereby the control portion 25 can reliably create the comparison result.

According to this embodiment, the control portion 25 is so formed as to determine whether or not the packet data 50 transmitted in the local area network 4 is acquired on the basis of the comparison result stored in the memory portion 27, whereby the control portion 25 can easily check each of the eight MAC addresses 51 registered in the address control table 23 and the destination MAC address 51a given to the packet data 50 on the basis of the comparison result stored in the memory portion 27.

According to this embodiment, the control portion 25 is so formed as to create the address control table 23 by sequentially acquiring MAC address from each of the plurality of communication devices 10 (terminals A to H), whereby the MAC addresses 51 which all of the communication devices 10 connected to the same local area network have can be reliably acquired.

According to this embodiment, the control portion 25 so controls as to determine whether or not the packet data 50 transmitted in the local area network 4 through the external network 1 such as the Internet is acquired on the basis of the comparison result by the address comparison portion 26, whereby each of the plurality of communication devices 10 is distinguished by employing only the MAC addresses 51 in an environment where the communication devices 10 (terminals A to H) constituting the local area network 4 are individually connected to the external network 1 such as the Internet, and hence a load of the control portion 25 can be reliably reduced dissimilarly to a case of specifying the destination (terminals A to H) by referring both of the IP addresses and the MAC addresses in communication of the packet data with the external network 1.

According to this embodiment, comparison of the MAC address 51 by the address comparison portion 26 is performed on the data link layer in the OSI reference model, whereby each of the plurality of the communication devices 10 (terminals A to H) may not be distinguished by using the network layer which is a higher order than the data link layer, and hence communication between the communication devices 10 in the local area network 4 can be performed by a simple communication protocol.

Although the present invention has been described and illustrated in detail, it is clearly understood that the same is by way of illustration and example only and is not to be taken by way of limitation, the spirit and scope of the present invention being limited only by the terms of the appended claims.

For example, while the address comparison portion 26 compares for the data regions, where the "node numbers" are stored, of the MAC address 51 sequentially in the bit-by-bit manner until the MAC addresses 51 corresponding to the terminals A to H can be distinguished from each other in the aforementioned embodiment, the present invention is not restricted to this. In the present invention, the address comparison portion 26 may be so formed as to compare the MAC addresses 51 corresponding to the terminals A to H from the data regions recording the "OUI identifiers" (manufacturer codes) of the MAC addresses 51 sequentially in the bit-by-bit manner until the MAC addresses 51 can be distinguished from each other and to further compare the MAC addresses 51 corresponding to the terminals A to H for the data regions recording the "node numbers" of the MAC addresses 51 sequentially in the bit-by-bit manner in the until the MAC addresses 51 can be distinguished from each other when the MAC addresses 51 can not be distinguished in the data regions recording the "OUI identifiers". Thus, the plurality of the communication devices can be easily individually distinguished.

In the aforementioned embodiment, the MAC addresses 51 corresponding to the terminals A to H may be further compared for the data regions recording the "OUI identifier" of the MAC addresses 51 sequentially in the bit-by-bit manner until the MAC addresses 51 can be distinguished from each other when comparison starts from the data regions recording the "node numbers" of the MAC addresses 51, and the MAC addresses 51 can not be distinguished from each other in the data regions recording the "node numbers".

While the address comparison portion 26 compares the MAC addresses from the least significant bits of the data regions recording the "node numbers" of the MAC addresses 51 sequentially every 1 bit in the aforementioned embodiment, the present invention is not restricted to this. In the present invention, the address comparison portion 26 may compare the MAC addresses from the least significant bits of the data regions recording the "node numbers" of the MAC addresses 51 sequentially every 8 bits other than every 1 bit. In other words, at a step S2 of a control flow in FIG. 7, the address comparison portion 26 may compare data of 8 bits counting from the least significant bits of the "node numbers" of the terminals A to H in a lump by performing arithmetic processing once. Thus, the plurality of the communication devices 10 can be more rapidly distinguished dissimilarly to a case where processing for comparing every 1 bit or every 2 bits is repeated. Particularly, processing for comparing data of 8 bits in a lump is suitable for arithmetic processing in a 16-bit processor or a 32-bit processor.

While each of the LAN adapters 20 of the communication devices 10 (terminals A to H) connected to the local area network 4 performs learning of the MAC addresses 51 registered in the address control table 23 in the aforementioned embodiment, the present invention is not restricted to this. In the present invention, only a specific communication device 10 (terminal A, for example) may perform leaning of the MAC addresses 51 registered in the address control table 23 to create a comparison result obtained after comparison of the eight terminals, and other communication devices 10 (terminals B to H in this case) or the router 2 may be formed that the communication system is managed in a state of sharing the comparison result by the terminal A in each storage portion (memory portion 27).

While the LAN adapter 20 provided in the communication device 10 is so formed to have the function of performing the learning of the MAC addresses 51 registered in the address control table 23 in the aforementioned embodiment, the present invention is not restricted to this. In the present invention, the control circuit portion 30 of the communication device 10 may be so formed as to have the function of performing the learning of the MAC addresses 51 registered in the address control table 23.

What is claimed is:

1. A communication apparatus comprising:
   a first storage portion storing an address control table registering a MAC address which each of a plurality of communication devices connected to the same local area network has;
   a comparison portion distinguishing each of registered said MAC addresses by comparing said MAC addresses corresponding to said plurality of communication devices registered in said address control table sequentially in a bit-by-bit manner until said MAC addresses can be distinguished from each other; and
   a control portion determining whether or not data transmitted in said local area network is acquired on the basis of a comparison result by said comparison portion;
   wherein said comparison portion is formed to end said comparison in the bit-by-bit manner when each of registered said MAC addresses is distinguished.

2. The communication apparatus according to claim 1, wherein
   said MAC address includes a first address data region recording a manufacturer of said communication device and a second address data region recording a unique number assigned to each of said communication devices by said manufacturer, and
   said comparison portion distinguishes each of registered said MAC addresses by comparing said MAC addresses corresponding to said plurality of communication devices from said second address data regions of said MAC addresses sequentially in the bit-by-bit manner until said MAC addresses can be distinguished from each other.

3. The communication apparatus according to claim 2, wherein
   said second address data region is arranged on a low-order side of said MAC address, and
   said comparison portion distinguishes each of registered said MAC addresses by comparing said second address data regions sequentially from least significant bit sides in said second address data regions of said MAC addresses in the bit-by-bit manner until said MAC addresses corresponding to said plurality of communication devices can be distinguished from each other.

4. The communication apparatus according to claim 3, wherein
   if each of registered said MAC address is not distinguished on the basis of the comparison result of said second address data regions by said comparison portion, said comparison portion distinguishes each of registered said MAC addresses by comparing said first address data regions of said MAC addresses sequentially in the bit-by-bit manner until said MAC addresses corresponding to said plurality of communication devices can be distinguished from each other.

5. The communication apparatus according to claim 2, wherein
said first address data region is arranged on a high-order side of said MAC address, and said second address data region is arranged on a low-order side of said MAC address, and
said first address data region is half of a data region from the high-order side in all of the data region, which said MAC address has, toward the low-order side, and said second address data region is half of the data region from the low-order side in said all data region toward the high-order side.

6. The communication apparatus according to claim 2, wherein
said second address data region is formed by address data having a 8-bit data length in a lump, and
said comparison portion distinguishes each of registered said MAC addresses by comparing the address data having said 8-bit data length in a lump from least significant bit sides in said second address data regions of said MAC addresses until said MAC addresses corresponding to said plurality of communication devices can be distinguished from each other.

7. The communication apparatus according to claim 6, wherein
said comparison portion includes a 16-bit processor or a 32-bit processor.

8. The communication apparatus according to claim 1, wherein
said control portion is so formed as to create said comparison result on the basis of the end of said comparison in the bit-by-bit manner by said address comparison portion.

9. The communication apparatus according to claim 1, further comprising a second storage portion storing said comparison result where each of said MAC addresses is distinguished by said comparison portion, wherein
said control portion is formed to determine whether or not said data transmitted in said local area network is acquired on the basis of said comparison result stored in said second storage portion.

10. The communication apparatus according to claim 1, wherein
said control portion controls to transmit said comparison result to each of said plurality of communication devices.

11. The communication apparatus according to claim 1, wherein
said control portion is formed to create said address control table by sequentially acquiring said MAC address, which each of said plurality of communication devices has, from each of said plurality of communication devices.

12. The communication apparatus according to claim 1, wherein
said local area network is connected to an external network, and
said control portion controls to determine whether or not data transmitted in said local area network through said external network is acquired on the basis of said comparison result by said comparison portion.

13. The communication apparatus according to claim 1, wherein
said comparison of said MAC addresses by said comparison portion is performed on a data link layer in an OSI reference model.

14. A communication system comprising:
a plurality of communication devices connected to the same local area network; each of said plurality of communication devices includes:
a first storage portion storing an address control table registering a MAC address which each of said plurality of communication devices has,
a comparison portion distinguishing each of registered said MAC addresses by comparing said MAC addresses corresponding to said plurality of communication devices registered in said address control table sequentially in a bit-by-bit manner until said MAC addresses can be distinguished from each other, and
a control portion determining whether or not data transmitted in said local area network is acquired on the basis of a comparison result by said comparison portion,
wherein said comparison portion is formed to end said comparison in the bit-by-bit manner when each of registered said MAC addresses is distinguished.

15. The communication system according to claim 14, wherein
said MAC address includes a first address data region recording a manufacturer of said communication device and a second address data region recording a unique number assigned to each of said communication devices by said manufacturer, and
said comparison portion distinguishes each of registered said MAC addresses by comparing said MAC addresses corresponding to said plurality of communication devices from said second address data regions of said MAC addresses sequentially in the bit-by-bit manner until said MAC addresses can be distinguished from each other.

16. The communication system according to claim 15, wherein
said comparison portion distinguishes each of registered said MAC addresses by comparing said second address data regions sequentially from least significant bit sides in said second address data regions of said MAC addresses in the bit-by-bit manner until said MAC addresses corresponding to said plurality of communication devices can be distinguished from each other.

17. The communication system according to claim 16, wherein
if each of registered said MAC addresses is not distinguished on the basis of the comparison result of said second address data regions by said comparison portion, said comparison portion distinguishes each of registered said MAC addresses by comparing said first address data regions of said MAC addresses sequentially in the bit-by-bit manner until said MAC addresses corresponding to said plurality of communication devices can be distinguished from each other.

18. The communication system according to claim 15, wherein
said first address data region is arranged on a high-order side of said MAC address, and said second address data region is arranged on a low-order side of said MAC address, and said first address data region is half of a data region from the high-order side in all of the data region, which said MAC address has, to the low-order side, and said second address data region is half of the data region from the low-order side in said all data region to the high-order side.

19. The communication system according to claim 14, wherein each of said plurality of communication devices further includes a second storage portion storing said comparison result where each of said MAC addresses is distinguished by said comparison portion, wherein said control portion is formed to determine whether or not said data transmitted in said local area network is acquired on the basis of said comparison result stored in said second storage portion.

\* \* \* \* \*